C. W. PARKER.
TRACTOR AXLE.
APPLICATION FILED DEC. 11, 1918.

1,367,088.

Patented Feb. 1, 1921.
3 SHEETS—SHEET 1.

Inventor
Clark W. Parker.
By Pagelsen and Spencer
Attorneys

UNITED STATES PATENT OFFICE.

CLARK W. PARKER, OF NEW YORK, N. Y.

TRACTOR-AXLE.

1,367,088.  Specification of Letters Patent.  Patented Feb. 1, 1921.

Application filed December 11, 1918. Serial No. 266,219.

*To all whom it may concern:*

Be it known that I, CLARK W. PARKER, a citizen of the United States, and residing at New York, in the county of New York and State of New York, have invented a new and Improved Tractor-Axle, of which the following is a specification.

This invention is a modification of the structure set forth in my application Serial No. 266218 filed on the same date as this application, and its object is to provide an axle construction in which that portion which extends across between the wheels shall be at a different height than the central line of the wheels on the axle. Another object of this invention is to provide a rear axle structure which will permit the central portion of the axle to be on the same level as the central line of the engine, so that all the shafts when connected together may be in a substantially straight line.

This invention consists in so constructing the rear axle that the stub-axles and the transverse shaft that drives the wheels shall be in the same vertical plane, the shaft being above the stub-axles, and the driving shaft that is operatively connected to the crank shaft of the engine and to the transverse shaft at the rear axle shall extend substantially horizontally at right angles to this plane. It also consists in so forming the tractor wheels and the brakes therefor and the supporting mechanism for the wheels and brakes, as to provide a lubricant receptacle which surrounds the driving gears and brakes.

Figure 1:
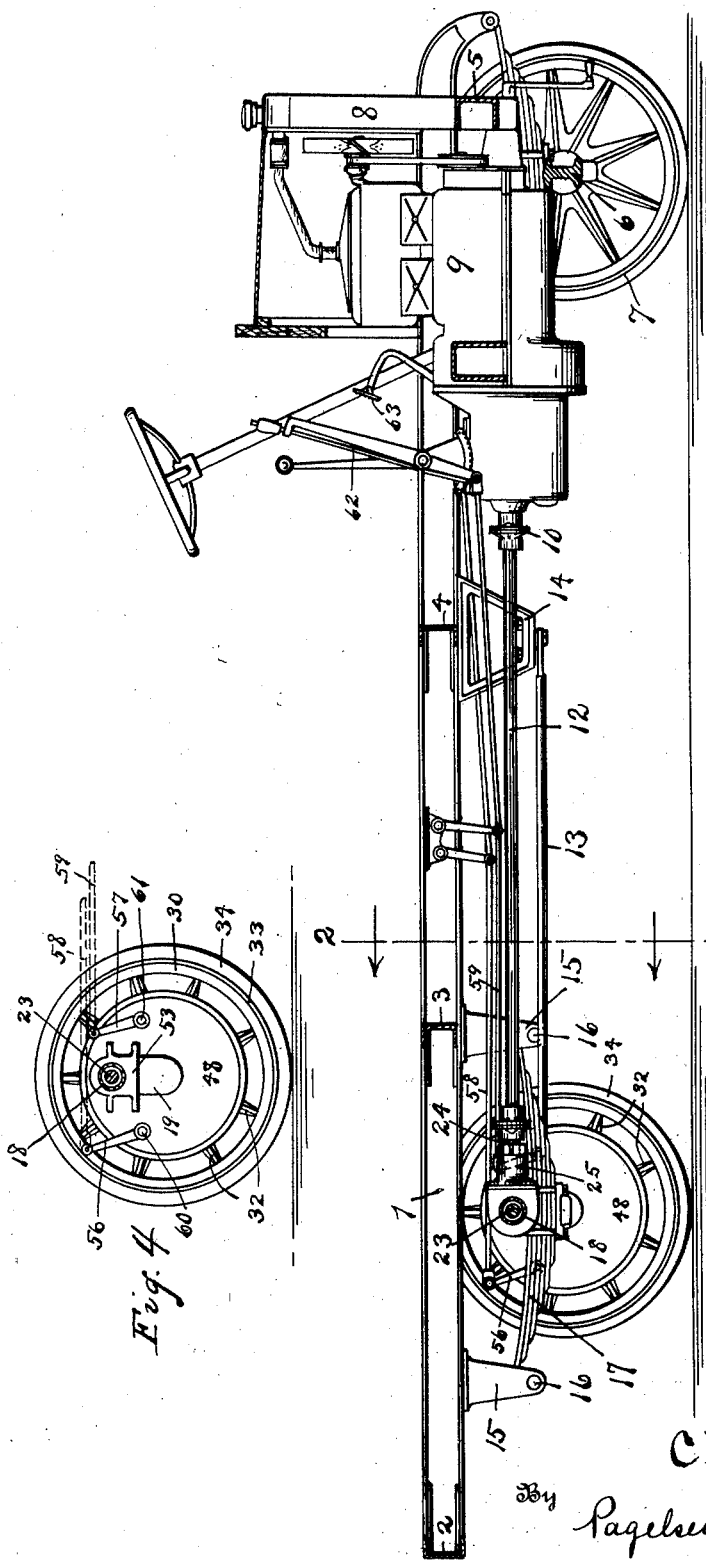
Figure 2:
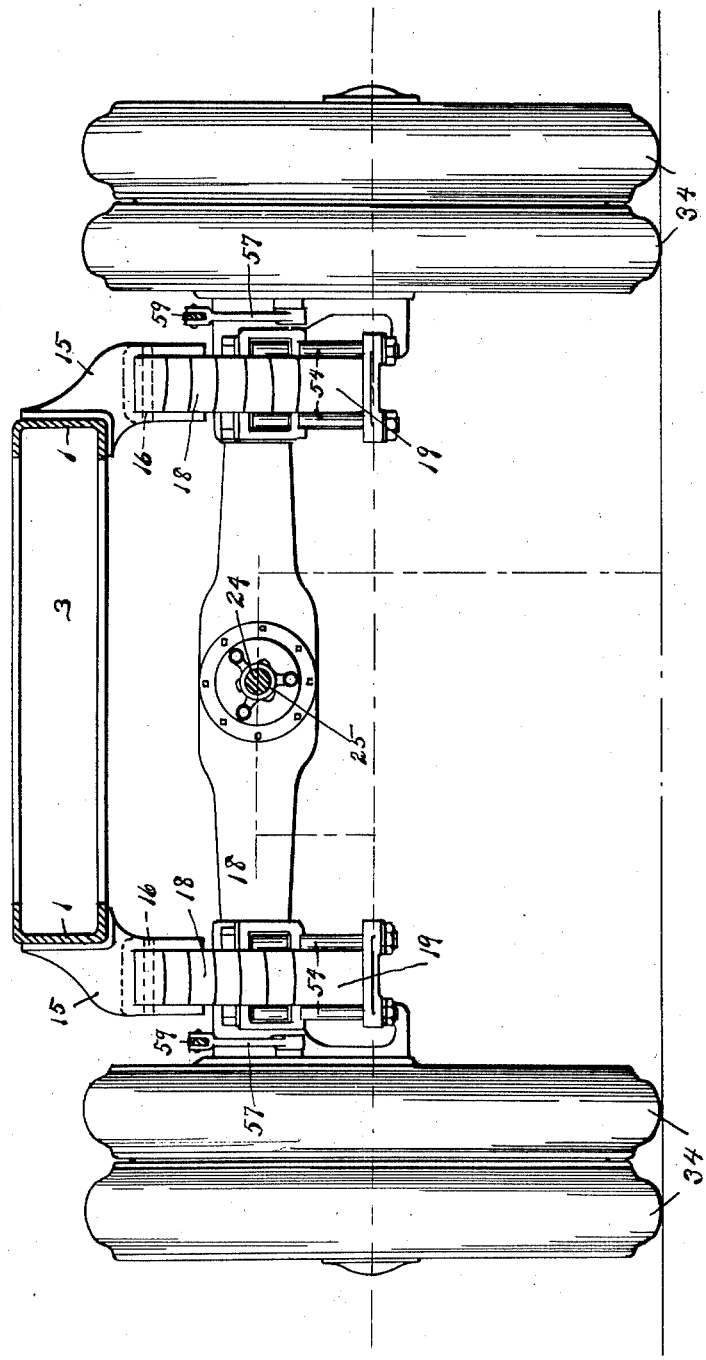
Figure 3:
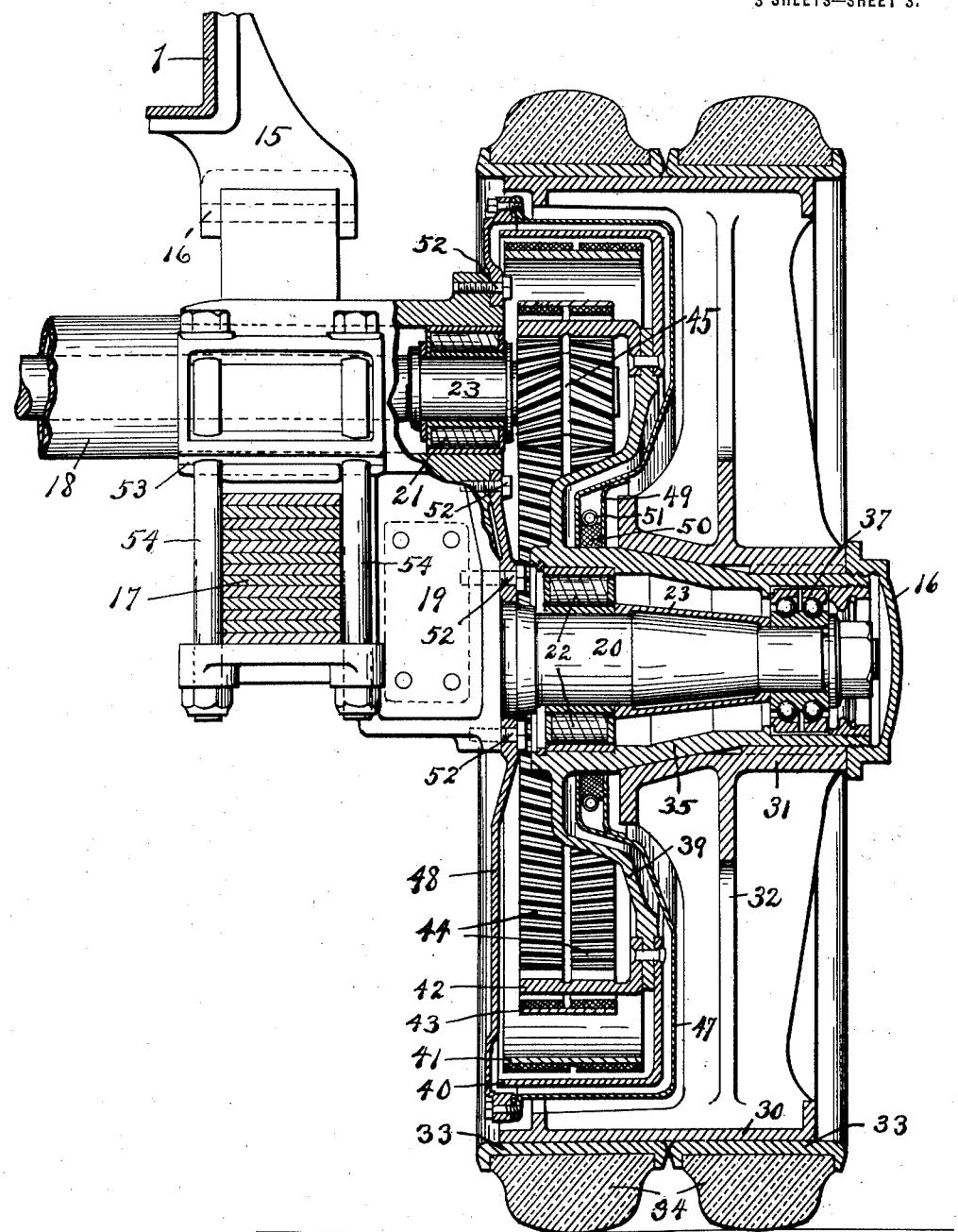

In the accompanying drawings Figure 1 is a longitudinal elevation of the driving mechanism of a motor vehicle. Fig. 2 is a section on the line 2—2 of Fig. 1. Fig. 3 is a vertical longitudinal section of a tractor wheel. Fig. 4 is an elevation of a tractor wheel.

Similar reference characters refer to like parts throughout the several views.

In Fig. 1 the side bar 1 and transverse bars 2, 3, 4 and 5 of the chassis, the front axle 6, front wheel 7, radiator 8, and engine 9 are shown conventionally. A universal joint 10 connects the longitudinal or propeller shaft 12 to the engine. The well known radius rod 13 extends from the rear axle to the bracket 14 secured to the side bar 1. Brackets 15 extend down from the side bars 1 and carry pins 16 to which the ends of the springs 17 connect in any desired manner. These springs may be secured to the saddles 53 by means of the bolts 54. The above mentioned parts form no part of this present invention.

The rear axle and the parts connected thereto are clearly shown in Figs. 2 and 3. A heavy casing 18 extends across the vehicle and secured to its ends are the brackets 19, each of which supports a stub-axle 20. These two stub-axles, the casing 18 and the brackets connecting them constitute the rear axle of the vehicle. These parts are so proportioned that the road clearance of the casing 18 is great, while the roller bearings 21 in the brackets 19 support the two-part shaft 23 vertically above the stub-axles. The plane of this axle will pass through the stub-axles and the shaft 23. The height of this shaft 23 and the short shaft 24 connected thereto by any desired type of gearing, a differential gearing such as shown in Fig. 4 of the companion case preferred, is such that these shafts and the shaft 12 and the engine shaft will normally be a straight horizontal line. The shaft 24 will therefore be at right angles to the plane of the axle. Any type of auxiliary casing 25 may extend around the short shaft 24.

The structure of the tractor wheel is substantially the same as that shown in the main application filed herewith and its parts operate in the same manner. The felly 30 connects to the sleeve 31 by means of spokes 32. Rims 33 carry tires 34 of any desired type. The sleeve 31 is secured to the hub 35 and within the hub are the bearings 22 and 37. It will be seen that these bearings may be of any desired size and type and the actual length of bearing may be as great as thought necessary.

A web 39 on this hub carries a brake drum 40 for the brake band 41 and a second ring 42 is engaged by the second brake-band 43, as fully described in the main application. The double rings of teeth 44 on the inner side of the ring 42 are engaged by the teeth of the pinion 45 on the shaft 23. These rings of teeth 44 are inclined in opposite directions and as a result the pinion 45 is prevented from moving endwise and other means to prevent this endwise movement are unnecessary. In this form of construction, the outer edge of the annulus 47 is secured to the outer edge of the web 48 which carries the brake mechanism, and this web and annulus constitute an oil receptacle into which the gears and brake mechanism extend. A collar 49 positions the packing ring 50 which is held against the hub by means of a coil spring 51. The web 48 is secured to the bracket 19 by means of bolts 52. The brake levers 56 and 57 connect to the brake operating shafts 60 and 61, and links 58 and 59 connect these levers to the hand lever 62 and brake pedal 63. The mechanism not shown may be the same as that shown in the application filed herewith.

In this present construction, the highly desired "straight-line" drive is obtained. The engine crank shaft and its bearings are substantially horizontal at all times and as the transverse shaft 23 and short shaft 24 may be at substantially the same height under light loading of the vehicle, the longitudinal shaft 12 will be substantially horizontal at all times. In motor vehicles where the rear end of the shaft 12 is lower than the front end, heavy wear comes upon the universal bearings at the ends of this shaft unless the engine is mounted inclined with the rear end of its crank shaft lower than the front end, in which case proper lubrication becomes extremely difficult. But by mounting the shaft 23 and the crank shaft of the engine at substantially the same level under light loads, while the rear end of the shaft 12 may at times be an inch or two above the engine shaft and at other times the same distance below, the normal movement above or below the line of the engine crank shaft will be extremely small so that the entire drive may be considered as being in one plane. This includes the crank shaft of the engine, the line shaft 12, the short shaft 24 and the differential gears, the transverse shaft 23, and the pinions 45 at the ends thereof.

The details and proportions of the various parts may all be changed by those skilled in the art without departing from the spirit of my invention as set forth in the following claims.

I claim:—

1. A driving mechanism for motor vehicles comprising an engine at the front end of the vehicle, a longitudinal shaft extending rearwardly therefrom and with its front end in alinement with the crank shaft of the engine, a second longitudinal shaft at the rear end of the first longitudinal shaft, a universal coupling between said longitudinal shafts, a transverse shaft at the rear end of the second longitudinal shaft and means connecting them, pinions on the ends of the transverse shaft, a pair of stub axles in the same plane and below the transverse shaft, tractor wheels mounted on said stub axles, and gear rings mounted on said wheels and meshing with the pinions on the transverse shaft, all of said shafts being normally in the same horizontal plane.

2. In a motor vehicle, the combination of a chassis, an engine at one end of the same, a transverse shaft at the other end of the chassis, a longitudinal shaft extending from the engine shaft parallel to the chassis to the transverse shaft, gearing connecting the shafts, a casing for the transverse shaft, stub-axles connected to said casing below the level of the shafts, wheels mounted on the stub-axles, and means to drive the wheels from said transverse shaft, all of said shafts being normally in substantially the same horizontal plane.

CLARK W. PARKER.